Sept. 7, 1943.                F. A. EICH ET AL                2,328,549
           METHOD OF GRINDING TWIST DRILLS AND MACHINE FOR SAME
                    Filed July 29, 1940            7 Sheets-Sheet 1

INVENTORS
Frank A. Eich
Frank E. Higgins
By their Attorney
Victor Cobb

Sept. 7, 1943.  F. A. EICH ET AL  2,328,549
METHOD OF GRINDING TWIST DRILLS AND MACHINE FOR SAME
Filed July 29, 1940  7 Sheets-Sheet 4

INVENTORS.
Frank A. Eich
Frank E. Higgins
By their Attorney
Victor Cobb.

Sept. 7, 1943.　　　　F. A. EICH ET AL　　　　2,328,549
METHOD OF GRINDING TWIST DRILLS AND MACHINE FOR SAME
Filed July 29, 1940　　　7 Sheets-Sheet 6

INVENTORS.
Frank A. Eich
Frank E. Higgins
By their attorney
Victor Cobb

Patented Sept. 7, 1943

2,328,549

UNITED STATES PATENT OFFICE 2,328,549

METHOD OF GRINDING TWIST DRILLS AND MACHINE FOR SAME

Frank A. Eich, Melrose, Mass., and Frank E. Higgins, Plaistow, N. H., assignors to United Shoe Machinery Corporation, Flemington, N. J., a corporation of New Jersey Application July 29, 1940, Serial No. 348,090

5 Claims. (Cl. 51—219)

This invention relates to a method of grinding a special drill and to a machine in which the drill may be ground in accordance with this method.

Although the special drill is disclosed herein so that the present invention will be better understood, it is also disclosed and is claimed in a co-pending application of the present inventors for a patent of the United States, Serial No. 373,156, filed January 4, 1941, which application is a division of the present application.

Heretofore, it has been difficult rapidly and easily to drill hard wood, such as maple, with the usual drill of the twist-drill type because the drill would not readily penetrate the work but would become overheated, which would draw its temper, and burn the wood. Accordingly, it has been necessary to use for this work a drill which has a sharp pyramidal center point and small circumferential lips which cut and define the outer wall of the bottom of the drilled hole before the chips are shaved off and removed from that part of the hole by the body of the drill. While such drills are suitable for this work, they must be kept sharp by frequent and difficult hand grinding in order to maintain them in proper working condition.

The special drill referred to is a multi-fluted, and preferably a double-fluted, twist drill with a point somewhat similar to the usual form of twist drill point but which is especially shaped to penetrate hard wood without excessive heating.

It is an object of the invention to provide a method of grinding this special drill and to provide a grinding machine in which this method may be employed to grind the drill to its suitable definite shape for the desired purpose without any special skill upon the part of the operator, the hand motion given to the drill by the operator being controlled by the grinding machine.

A feature of the method and machine is that, in sharpening the drill, the usual chisel edge that is regularly formed across the web of a drill at 90° to its axis is eliminated. This is especially important as such an edge impedes the penetration of the drill and scrapes or tears the fibres of the wood in the center of the hole being drilled. For such an edge, there is substituted one which is in two portions, each of which makes an angle of less than 90° to the axis of the drill, and together provide an edged web which is inclined to the surface being drilled and easily penetrates the work.

The end formed on the drill by this method and machine is diametrically symmetrical and it consists of four irregularly shaped, discontinuous faces meeting in a common point at substantially the geometric center of the drill.

In performing this method, the drill is given a series of advancing and retracting movements relatively to a traveling abrading surface, each retracting movement being in the reverse direction along the same path as that taken in advancing. A movement, in another direction, of relative feed between the end of the drill and the abrading surface is given before each advancing movement.

Each advancing movement of the drill consists of a continuous movement of combined translation along and revolution about a straight line, which line is inclined both to the axis of the drill and to the traveling abrading surface, said advancing movement first bringing the end of one of the lips of the drill into grinding contact with said surface to grind one of its lands and eventually, after repeated movements, to produce a cutting edge along the leading portion of said land. Secondly, in each advancing movement of the drill along and revolution about this straight line, the drill moves away from said grinding surface slightly and then, thirdly, comes into contact with it again, this time with its edge, which edge then grinds a concave clearance face back of the land while the drill point passes beyond the plane of the abrading surface. After the grinding of the two surfaces of this lip has been completed, the drill is finally retracted and is then symmetrically repositioned and the remaining unground lip or lips are operated upon in the same manner until all lands and concave clearance faces have been ground.

Preferably, the traveling abrading surface is the narrow radial face of a cup-shaped grinding wheel and, after the drill is given each advancing movement, it is fed slightly closer to the abrading surface and the operations of advancing, retracting and feeding are repeated until the land and concave clearance face are ground to recondition that lip of the drill for further use. Each of the other lips are likewise ground, in sequence, until the drill is wholly reconditioned.

Another feature of the machine consists of means for positioning and temporarily securing a gaging member upon the drill by which member the drill may be located lengthwise and rotatably in two symmetrical positions in a grinding machine.

A further feature of the invention consists of a grinding machine in which a drill of the kind covered by said divisional application may be manipulated by hand in a single, continuous, back-and-forth operation with the movements controlled by the machine, in accordance with the above method, to grind the two different faces on a lip of the drill.

Referring to the drawings,

Fig. 10 is a longitudinal sectional detail view of the drill holder, showing also the location of the portion of the grinding wheel which operates on the drill;

Fig. 11 is a view of the drill holder, taken at the angle from which Fig. 10 is taken, certain of the parts being cut away to disclose details of the cam mechanism;

Fig. 12 is a sectional view of the drill holder, taken on the line XII—XII of Fig. 11;

Fig. 13 is a development of the cam shown in Fig. 12.

Figures 1, 2, 3:
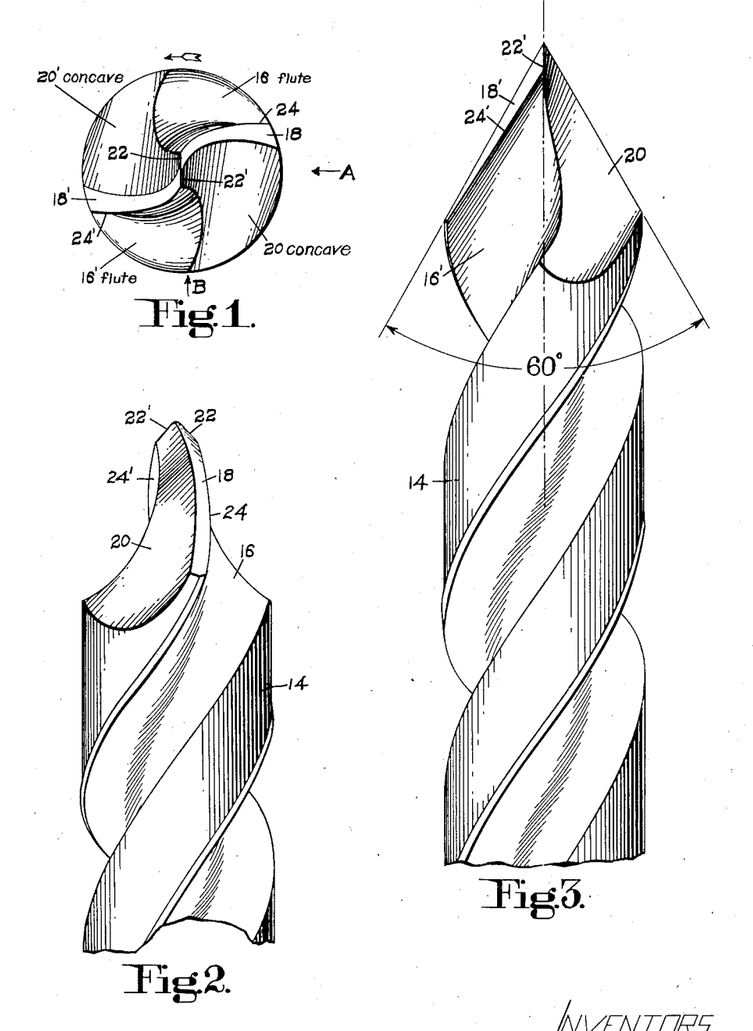
Fig. 1 is an enlarged end view of the drill of said co-pending divisional application.
Fig. 2 is an enlarged elevation of the drill looking in the direction of the arrow A in Fig. 1.
Fig. 3 is an enlarged view of the drill, looking in the direction of the arrow B in Fig. 1.
Figure 4:
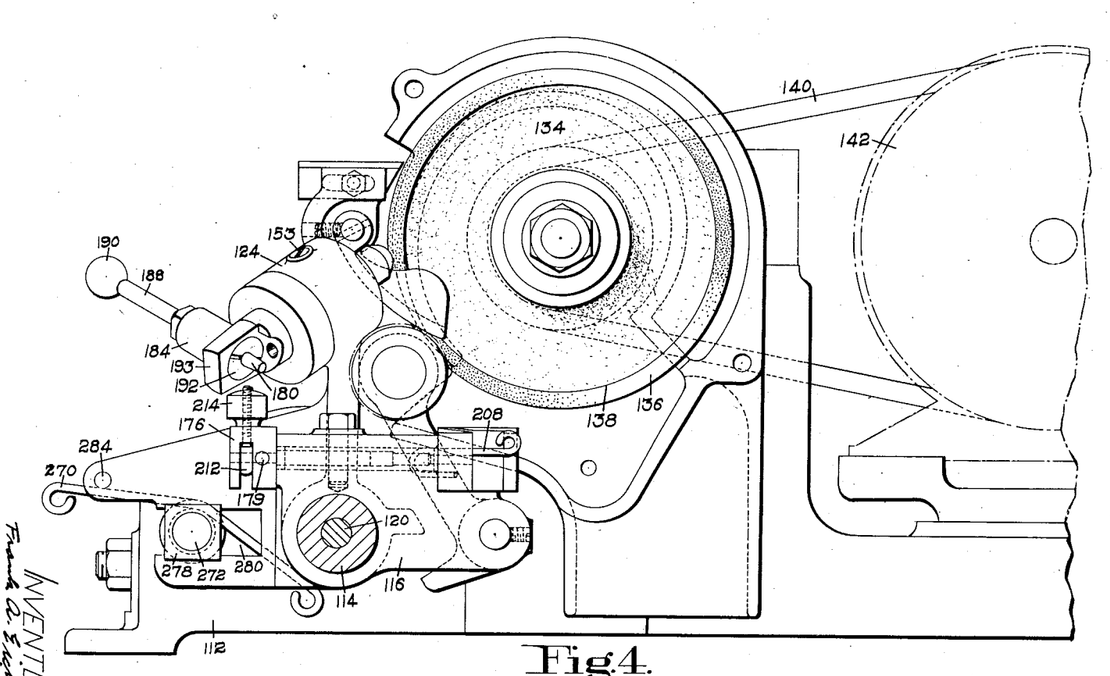
Fig. 4 is a right side elevation of the grinding machine with some of the parts shown in section.
Figure 5:
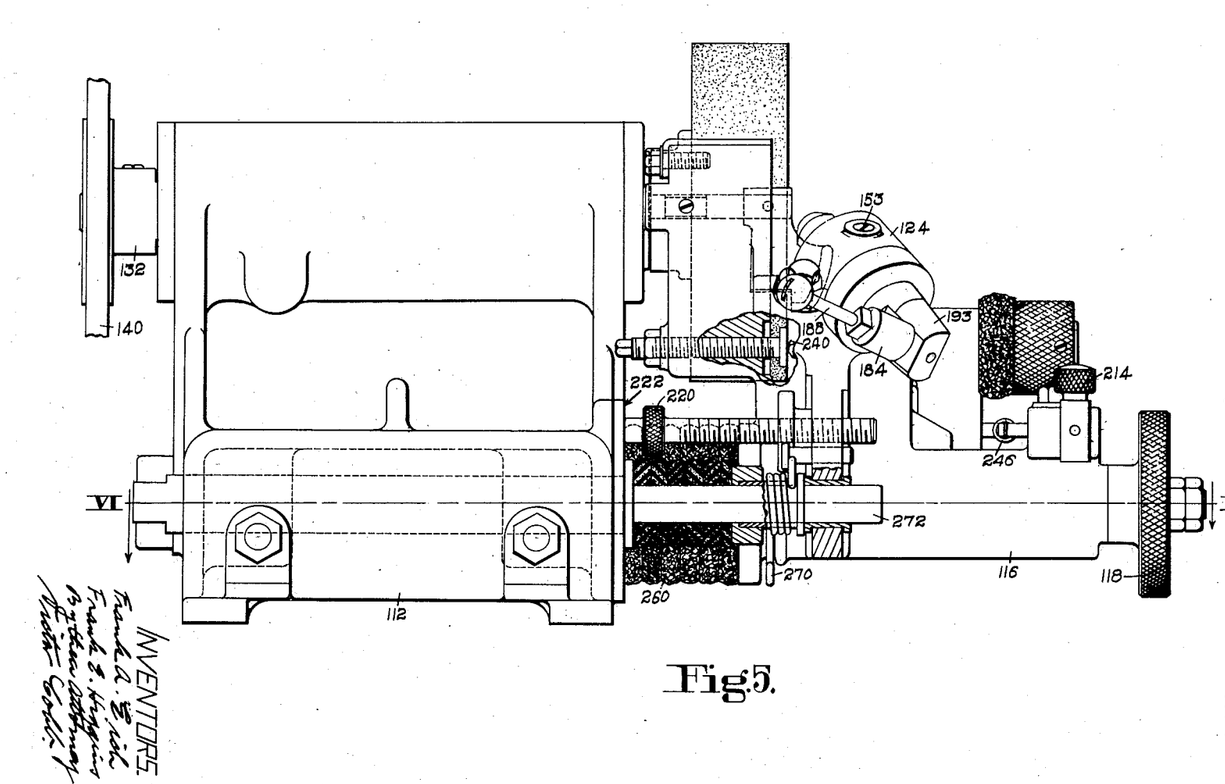
Fig. 5 is a front elevation of the grinding machine, with certain of the parts cut away.
Figure 6:
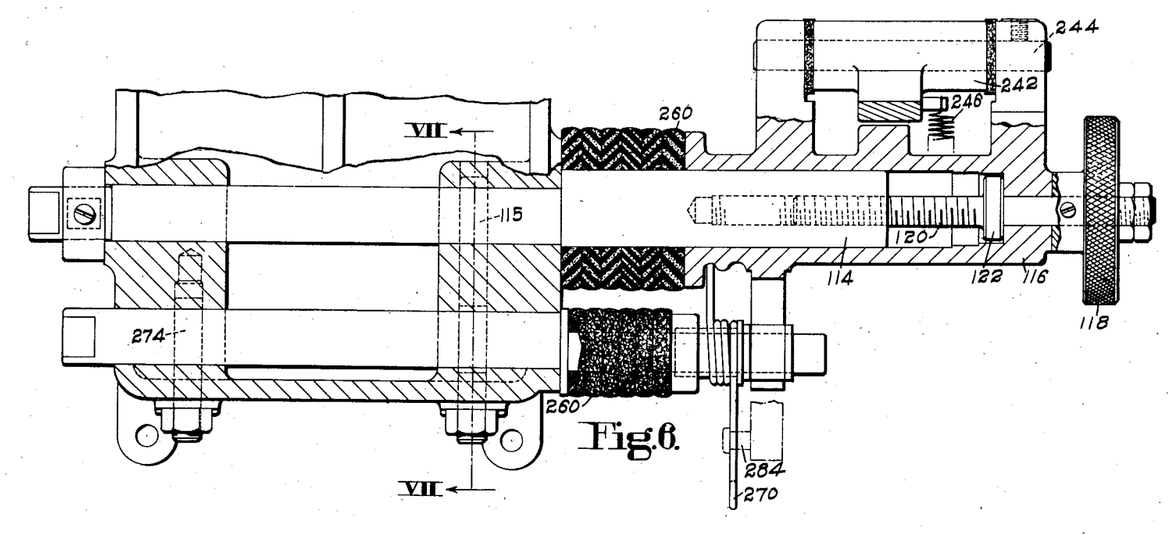
Fig. 6 is a sectional plan view of the mechanism by which the mounted drill is carried to the grinding wheel, taken on the line VI—VI of Fig. 5.
Figure 7:
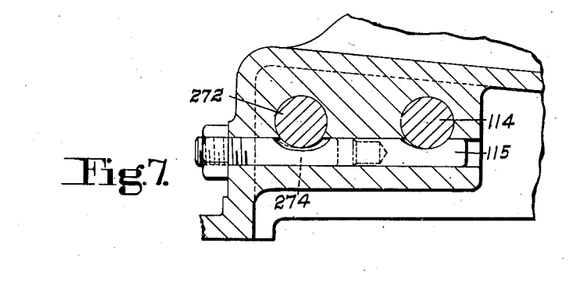
Fig. 7 is a sectional view of details of construction taken on the line VII—VII of Fig. 6.
Figure 8:
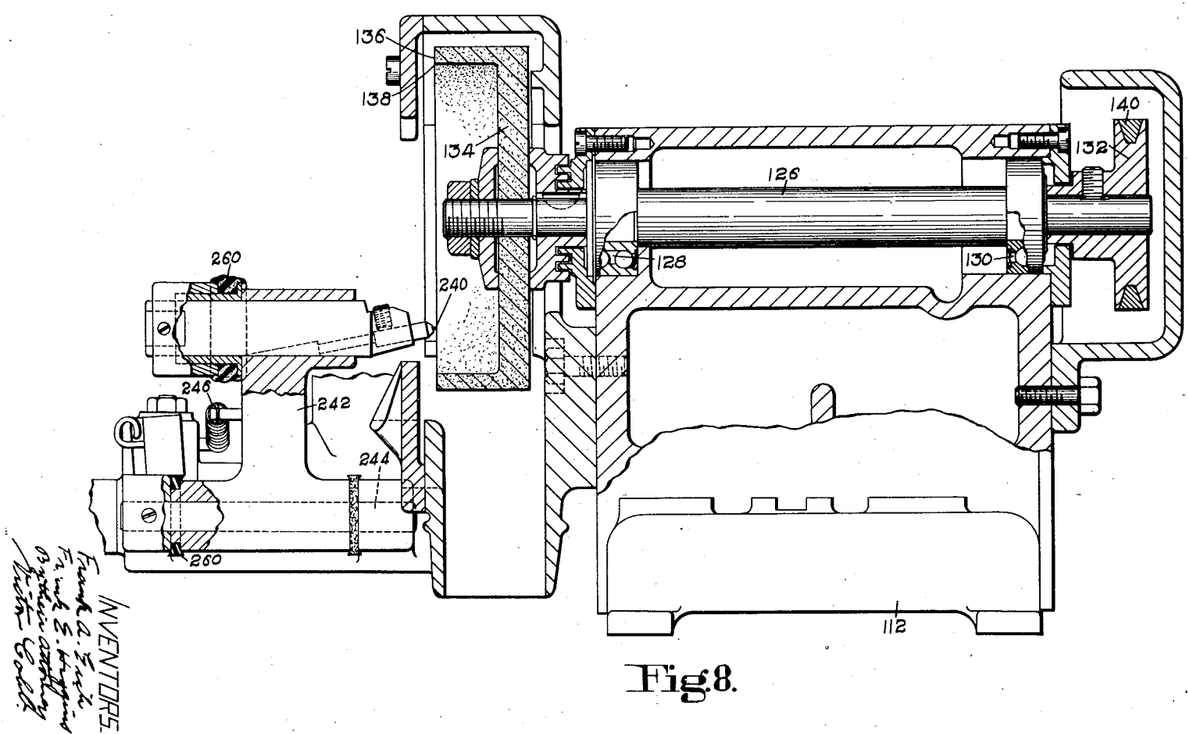
Fig. 8 is a sectional view of the grinding wheel mechanism and the diamond device for truing the wheel.
Figure 9:
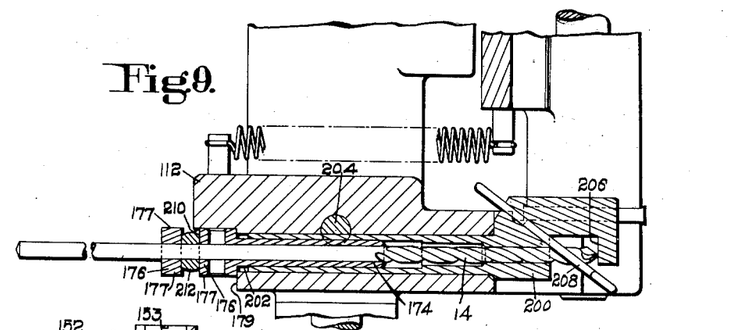
Fig. 9 is a detail view, principally in section, showing the mechanism for locating the drill in a holding bushing, preparatory to its insertion in the grinding machine.
Figures 10, 11, 12, 13:
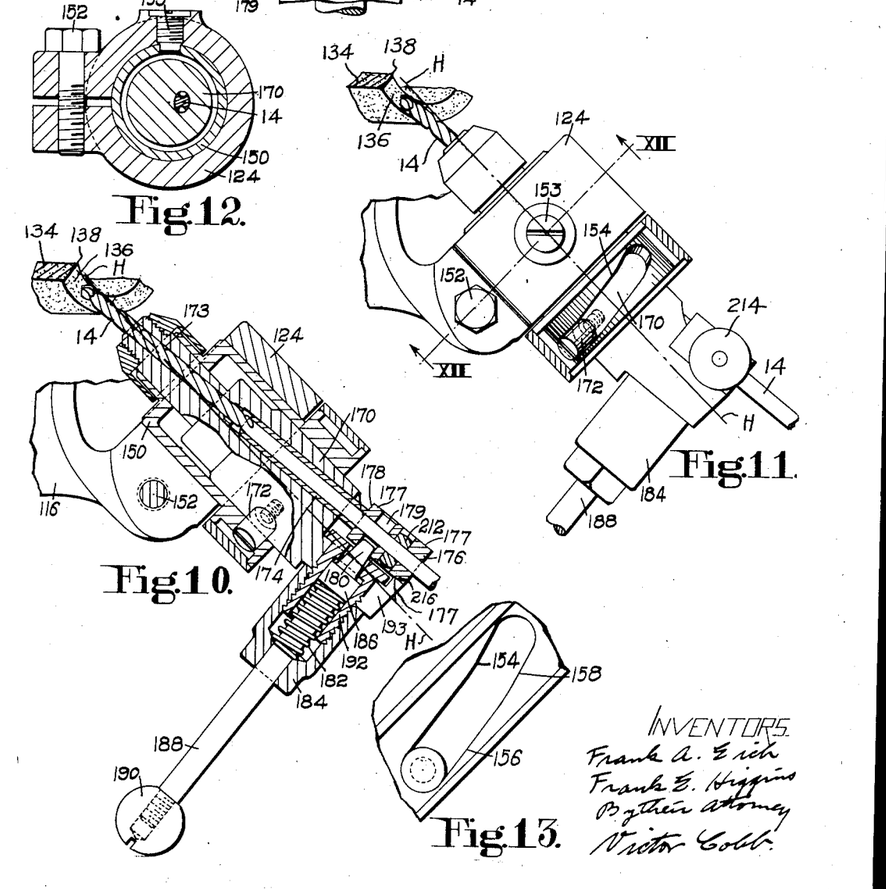

The reference character 14 designates the preferred form of drill of the divisional application which is illustrated in Figs. 1, 2 and 3 herein. It is a right hand, double-fluted twist drill so that, when operating to drill a hole, it rotates in the direction of the arrow in Fig. 1. It is provided with a novel end which makes it possible to drill hard wood at high speed without drawing the temper of the drill or burning the wood. In Fig. 1 the flutes are shown at 16 and 16'. The end of the drill is formed by four irregularly shaped, discontinuous surfaces which meet at the geometric center of the drill in substantially a common point. These surfaces are the narrow lands 18 and 18', which support the cutting edge and which lie (except for slight clearance) in the surface of a cone of approximately 60° included angle (see Fig. 3) and the wider concave clearance surfaces 20 and 20'. Each of the surfaces 20 and 20' are located behind each respective land and extend to substantially the geometric center of the drill, cutting into the web of the drill. Each land, and the concave clearance surface in front of it, meet to form a cutting edge on the web at one side of the center of the drill (i. e., 18' meeting with 20 and 18 with 20'), as indicated at 22 and 22' on what will be termed the forward edge of each land. The two parts of the cutting edge thus formed extend across the web of the drill in substantially a straight line (in end view).

The remaining portion of each cutting edge, as indicated at 24 and 24', continues in a curve at a considerable angle to the just-described portions 22 and 22', until it ends at the circumference of the drill. This part of each edge is formed by the meeting of the remaining portion of the forward edge of each land and the flute immediately in front of the same (i. e., 18 with 16 and 18' with 16'). Each concave clearance surface provides a path for guiding the chips to the adjacent flute, through which they pass from the work.

It should be noted that each concave clearance surface goes substantially to the center of the drill, each such surface cutting away a portion of the web but so related that sufficient metal remains on the web to support each cutting edge. The short or central portions 22 and 22' of the cutting edge, i. e., those on the web, lie in a substantially continuous axial plane. (However, the edge cannot lie exactly in such a plane as it is practically impossible to have the edges meet in exact alinement at an exact point at the geometric center of the drill, although in fact, each edge is offset from the center by only a few thousandths of an inch at the most. This offset may be considered in effect as a slight web of this dimension. Accordingly, although the drill of the present invention possesses a web having the strength of the usual drill, it possesses only a slight web at the penetrating point, whose thickness is practically nil.)

When viewed at right angles to this axial plane, these edge portions slant away from the center of the drill to leave a point. The remaining portions 24 and 24' of the two cutting edges are formed on the forward edge of each land and, therefore, this portion of each cutting edge is much steeper than the portion lying on the web because it lies in the 60° cone of Fig. 3. As all parts of each cutting edge slant or taper to the center of the drill, the drill will easily penetrate hard or other wood. In other words, the drill does not have the usual chisel edge that lies at right angles to the axis of the drill and which, as before stated, scrapes and tears the fibres of the wood in the center of the hole.

The machine for grinding the drill, as illustrated in Figs. 4 to 18 inclusive, will now be described.

Mounted on a base 112 is a shouldered rod 114, the smaller portion of which is eccentric to the other portion whereby the location of the larger portion may be changed by rotation and then clamped in adjusted position by a draw-bolt 115 passing through the base. Upon the rod 114 a carriage 116 is slidably mounted and its position may be adjusted along the rod by a knurled handwheel 118 which is secured to an adjusting screw 120. This adjusting screw is provided with an integral collar 122 and the smooth portion of the adjusting screw between the collar and the knurled handwheel operates in a bearing in the carriage 116. The threaded portion of the screw operates in a tapped hole in the rod 114. The handwheel 118 may be adjusted on the screw so as to secure a close fit endwise of this bearing whereby, upon turning the handwheel, the carriage 116 may be micrometrically adjusted along the shaft in either direction. The carriage has integral therewith, a split bearing 124 (Figs. 4, 5 and 11) which is oblique to the rod 114 in all directions, and which will be referred to below.

The base 112 also carries a rotary shaft 126 (Fig. 8) mounted in ball bearings 128 and 130. This shaft carries, at one end, a V-grooved pulley 132 and, at the other end, a cup-shaped grinding wheel 134 having a short radial face 136 and a corner 138 at one edge of this face, said face and corner being used for grinding the drill of the present invention. The pulley 132 is driven by a V-belt 140 from a pulley 142 on an electric motor.

The obliquely positioned split bearing 124, referred to above, has a bushing 150 (Fig. 10) secured in it by a clamp screw 152 by which the bearing is contracted, the bushing having first been located by a screw 153, tapped into the bearing 124, with its unthreaded end entering a hole in the bushing. The bushng 150 is provided with a cam slot 154 (Figs. 11 and 13) having one portion 156 at a slight pitch and the remaining portion 158 at a somewhat steeper pitch. Mounted in the bushing 150 is a drill holder 170 which is arranged to slide and turn in the bushing 150, the sliding and turning being controlled by a screw stud 172 screwed into the drill holder 170. The large head of this stud acts as a follower in the cam slot 154. By this arrangement, the drill holder 170 is prevented from being separated from the bushing 150 and, at the same time, the cam slot 154 and stud 172 guide the drill holder in a motion of rotation and longitudinal translation in the manner to be described.

When it is to be ground, the drill of the divisional application is arranged to occupy a bore 173 in the drill holder 170, (Fig. 10), which bore is displaced at a slight angle to the axis of the holder, with the axes intersecting at a point near the outer end of the holder. At the end toward the shank end of the drill and for about one-half its length, the bore 173 is counterbored to fit the outside of a gaging bushing 174, the inside of the bushing being bored to fit the drill. This bushing is secured to the drill (as will be described later) and has an elongated, rectangular head 176, two opposite, parallel faces of which are finished accurately, relative to the center of the bore, to serve as gaging surfaces 177, for positioning the drill and bushing in the grinding machine in either of two positions 180° apart. The head 176 is also provided with another gaging surface 178, which surface is that from which the tubular portion of the bushing projects and is at right angles to the axis of the bushing. This gaging surface 178 is for locating the bushing lengthwise on the drill, relative to the point, as will be described.

For securing the bushing in the drill holder and for locating it lengthwise, a plunger mechanism is provided with a plunger for entering a bore 179 in the head 176, which bore intersects the bore for the drill at right angles. The plunger mechanism consists of a plunger 180 with a tapering end to enter either end of the bore 179 for positioning the bushing lengthwise of the drill holder in either one of its two rotative positions. The plunger is forced into engagement with the bore 179 by a coil spring 182. This spring is held between the inside end of a housing 184 and a guiding collar 186 integral with a rod 188 upon which the plunger is formed and which passes through a guiding hole in the housing 184. On the opposite end of the plunger rod 188 is a knob 190 serving as a handle for manually operating the plunger axially to engage and disengage it from one end of the bore 179 and to engage it with the other end of the bore when the drill is replaced in the drill holder after it has been rotated 180°. The knob 190 with the plunger rod 188 together serve as a handle to manipulate the holder 170 in a manner to be described. The collar 186 is guided in a hole in an externally threaded bushing 192 secured to an extension 193 of the drill holder 170 by the housing 184, which serves the purpose of a nut for securing the bushing in position.

The gaging bushing 174 is positioned on and secured to the drill in the following manner: A gaging device 200 (Fig. 9) is held in a bore 202 in the base 112 of the machine by a drawbolt 204 and is permanently located thereby. This device has a bore for holding the bushing 174 and drill 14 and is provided with a gaging surface 206 against which the point of the drill is positioned lengthwise. Arranged to engage a flute of the drill near its point is a heavy grasshopper spring 208. With the spring thus engaged and with the point of the drill positioned against the surface 206, the drill is located in a definite position relatively to the base of the machine. It will be noted that the bushing 174 is similarly positioned in the bore 202 with one of its gaging surfaces 177 against a finished gaging surface 210 on the base 112 of the machine and with its gaging surface 178 against another gagin surface 179 on the base of the machine and at right angles to the gaging surface 210. With the bushing 174 and the drill thus definitely located, they are secured together by a draw-eyebolt 212 and a thumb nut 214 (Figs. 4, 9 and 11) mounted thereon, the drill passing through the eye of the bolt, and the shank of the bolt passing through a hole in the bushing 174. It will be seen that this positions the point of the drill definitely with respect to the gaging surfaces 177 and 178 on the bushing 174 and with the bore 179 therein into which the locking plunger 180 operates.

When the bushing 174, with the drill 14 secured thereto by the eyebolt 212, is positioned in the drill holder 170, and locked therein by the plunger 180, as above described, one of the gaging surfaces 177 contacts a gaging surface 216 on the extension 193 of the drill holder 170 to locate the bushing and drill rotatively, the point of the drill then being in accurate position to grind one of its lips. When this grinding is completed, the drill is relocated in the holder symmetrically in a position 180° from the first position, with the other gaging surface 177 in contact with the gaging surface 216, ready to grind the other lip, as will be described.

When the knob 190 and rod 188 are manually manipulated as a single handle (Fig. 10), the drill holder 170 is rotated about its own axis (indicated as H—H) and is also advanced along the same axis by the cam slot 154 and cam stud 172, first at a comparatively slow rate and afterwards at a more rapid rate, to give to the drill holder a combined motion of rotation about, and longitudinal translation along, the axis H—H of the drill holder. As the axis (indicated as D—D) of the drill 14 is inclined at an angle to the axis H—H of the drill holder 170, the rotation of the drill holder gives to the drill itself a motion of revolution about said axis H—H of the drill holder. (See Figs. 14 to 18 inclusive.)

To bring the drill into contact with the grinding wheel, the carriage 116 is fed by the handwheel 118 axially along the shaft 114, which is parallel to the axis of the grinding wheel shaft 126, the end of the drill finally coming into contact with the short radial face 136 of the cup-shaped grinding wheel 134 for grinding the drill.

In the following description of the grinding operation, it is assumed, for convenience in description, that all of the grinding of one lip is performed by one continuously forward right-hand advancing movement of the drill holder 170 about its axis H—H by manipulating the knob 190. Actually, however, such a mode of operation would be liable to draw the temper of the drill and overload the delicate mechanisms of the grinding machine. Accordingly, several repeated advancing and retracting movements are given to the drill holder by the knob 190 while the drill is fed slowly to the grinding wheel by turning the handwheel 118. Each complete advancing and retracting movement of the knob 190 causes the grinding away of only a slight amount of material from the drill but with the same final result upon the shape of the drill that would be obtained if only one movement were used to remove the same total amount of material, as is assumed in the following description.

The grinding operation will now be described in the above-assumed manner.

The knob 190 is manipulated by giving it a continuously forward, right-hand motion, which first causes the radial face 136 of the wheel to grind the land of the drill. (See Fig. 14.) Further continued rotation with its consequent feed of the drill holder by the cam slot 154 and the cam pin 172, together with the angular displacement of the drill, (i. e. the angular relation of H—H and D—D) then causes a slight separation of the drill from the radial face of the grinding wheel (Fig. 15) but further motion causes the end of the drill to contact with the edge 138 of the grinding wheel to grind a concave clearance face back of the land. (See Fig. 16.) As this is being done, the point of the drill passes beyond the plane of the radial face 136 of the wheel. When this operation is completed (Fig. 17) one lip is completely sharpened.

Figures 14, 15, 16, 17, 18:
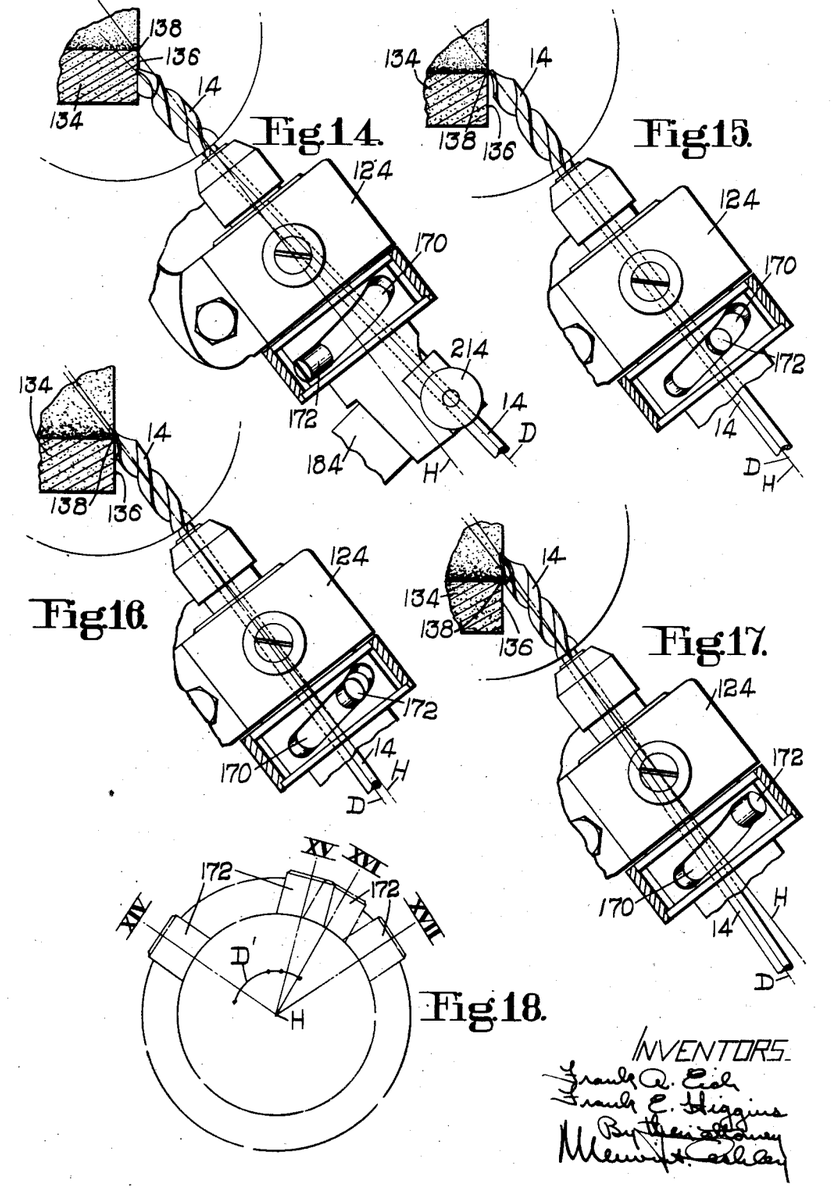
Fig. 14 shows the relative positions of the drill holder, the drill, and the grinding wheel at the beginning of the grinding operation; the end of the drill and the grinding wheel being considerably magnified.
Fig. 15 is a view similar to Fig. 14 but taken at the time that the drill becomes separated from the grinding wheel.
Fig. 16 is a view similar to Fig. 14 but taken after the drill has come into contact with the edge of the abrading surface to grind the concave portion behind the land of the drill.
Fig. 17 is a view similar to Fig. 14 but taken at the completion of the grinding operation.
Fig. 18 is an enlarged diagrammatic representation looking along the axis of the drill holder and indicating the rotative position of the parts corresponding to the showings in Figs. 14 to 17 inclusive.

In the above, Fig. 18 indicates, by the position of the cam stud 172, the amount of rotation of the drill holder 170, about its axis H—H, in each of the Figs. 14 to 17 inclusive, as indicated by the corresponding Roman numerals. The arc D' shows, in plan view, the spiral path described by the point of the drill 14, the dots in this arc indicating the position of the point at each of said corresponding positions.

When the sharpening operation of one lip is completed, an adjustable stop screw 220, mounted in the carriage 116, makes contact with the surface 222 on the frame of the machine. As the wheel wears away this screw may be backed away slightly to permit the carriage to move farther to complete the sharpening operation. After one lip has been sharpened, the drill is repositioned in the drill holder in a position removed 180° from the first position and the remaining lip is ground in like manner, thus completely sharpening the drill with two discontinuous surfaces on each lip to produce a drill, as herein described, and as claimed in said divisional application, for operating in hard wood.

The grinding machine is equipped with several other features for adding to its effectiveness and convenience, which will now be described.

In order to maintain the short radial face 136 of the wheel flat and to maintain the corner 138 at a right angle, a diamond tool 240 (Fig. 8) is mounted on a swinging arm 242 which, in turn, is mounted on the carriage 116 and moves therewith in maintained proper alinement with the point of grinding contact between the wheel and the drill. Pivotally mounted on a pin 244, this tool is normally out of contact with the grinding wheel, the arm being retracted by a spring 246 against the force of which the operator may readily bring the diamond into operating position when needed.

In order to prevent abrasive dust from wearing away certain moving parts, these are provided with sponge rubber washers 260 (Figs. 5 and 6) which yield and permit movement of the parts without allowing abrasive dust to penetrate and cause wear.

In order to take up any back-lash between the rod 114 and the carriage 116, the carriage is held against counter-clockwise rotation by a grasshopper spring 270 (Figs. 4, 5 and 6) which surrounds a guiding rod 272 positioned parallel to the rod 114 and eccentric to an enlarged portion adjustably secured in position by a drawbolt 274. Mounted on the rod 272 is a guide block 278 slidable in a slot 280 in the carriage 116. The block moves with the carriage 116 and travels along the shaft 272 so that the carriage operates upon the two rods 114 and 272. The grasshopper spring 270 has one of its arms contacting with a pin 284 mounted in the carriage, with its opposite end resting against the carriage 116 at a location below the rod 114.

Herein, the term "rotation" is used to indicate a turning of the drill holder about its own axis H—H and the term "revolution" is used to indicate the motion of the inclined drill as it turns about the same said axis.

Having thus described our invention, what we claim as new and desire to secure by Letters Patent of the United States is:

1. The method of of grinding a twist drill, which consists in moving a single handle and a drill connected therewith with a forward motion of translation inclined both to the axis of the drill and to a traveling abrading surface, said movement of the handle also causing the drill to revolve about a line lying in the direction of the motion of translation to give it a compound motion to grind one of the lands of the drill and produce a cutting edge along the leading portion of said land, continuing said movement to carry the drill beyond said surface and bring it into grinding contact with the edge of said abrading surface to grind a concave clearance face back of the land, symmetrically repositioning the drill, and repeating the operation for each land and clearance face.

2. The method of grinding a twist drill which consists in fixedly positioning a drill in a drill holder with the axis of the drill inclined to the axis of the drill holder, advancing both the drill holder and the drill by a single handle secured to said holder to give to said holder a compound motion of rotation about and longitudinal translation along said axis to bring the end of the drill into grinding contact with a face of a grinding wheel to grind one of the lands of the drill, continuing the said advancing motion to bring the drill into grinding contact with an edge of said face to grind a concave clearance face back of the land, symmetrically repositioning the drill in the drill holder and repeating the operation for each land and clearance face remaining unground.

3. The method of grinding a twist drill which consists in fixedly positioning a drill in a drill holder with the axis of the drill intersecting the axis of the drill holder at an acute angle, advancing both the drill holder and the drill by a single handle secured to said holder to give to said holder a compound motion of rotation about and longitudinal translation along said axis to bring the end of the drill into grinding contact with a face of a grinding wheel to grind one of the lands of the drill, continuing the said advancing motion to bring the drill into grinding contact with an edge of said face to grind a concave clearance face back of the land, symmetrically repositioning the drill in the drill holder and repeating the operation for each land and clearance face remaining unground.

4. The method of grinding a twist drill which consists in fixedly positioning a drill in a drill holder with the axis of the drill inclined to the axis of the drill holder, moving both the drill holder and the drill by a single handle secured to said holder to give to said holder a compound motion consisting of rotation about said axis and longitudinal translation along the same, first at one rate and then at another rate relatively to its rate of rotation, to bring one lip of the drill into grinding contact with a face of a grinding wheel to grind first one of the lands of the drill and then into grinding contact with an edge of said face to grind a concave clearance face back of the land, symmetrically repositioning the drill in the drill holder and repeating the operation for each land and clearance face remaining unground.

5. A drill-grinding machine having, in combination, a grinding wheel, a cylindrical bearing, a drill holder journaled in said bearing and movable axially therein, said holder having a drill-receiving bore disposed longitudinally of the holder at an angle to the axis thereof, to permit a drill to be so positioned in the bore with the point of the drill spaced from said axis that rotation of the holder will provide an arcuate component in the path of movement of the drill point, a connection between said holder and said bearing constructed and arranged to maintain a predetermined relation between the rotary and axial movements of the holder, a clamp on the holder for securing a drill in said bore, and a handle on the holder for turning it and the drill with a compound motion relatively to the bearing, a face of the wheel and an edge of the wheel being so related to said bearing and the holder with a drill therein that said compound motion serves first to cause a land of the drill to be ground by a face of the grinding wheel, then by reason of the arcuate component to move the point of the drill away from the grinding wheel, and finally by reason of both the advancing and the arcuate components to bring the point of the drill back to the grinding wheel in a position to cause a concave clearance surface back of the land to be ground by an edge of the wheel.

FRANK A. EICH.
FRANK E. HIGGINS.